US012606097B2

(12) United States Patent
Gutierrez et al.

(10) Patent No.:  US 12,606,097 B2
(45) Date of Patent:      Apr. 21, 2026

(54) MOUNTING SYSTEM FOR A VEHICLE COMPONENT

(71) Applicant: GM GLOBAL TECHNOLOGY OPERATIONS LLC, Detroit, MI (US)

(72) Inventors: Michael Andrew Gutierrez, Dearborn Heights, MI (US); Michael Thomas Quaggiotto, LaSalle (CA); Michael Dale Colman, East China Township, MI (US); Khao Phaydavong, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 328 days.

(21) Appl. No.: 18/500,060

(22) Filed: Nov. 1, 2023

(65) Prior Publication Data

US 2025/0136015 A1      May 1, 2025

(51) Int. Cl.
  B60R 11/00         (2006.01)
(52) U.S. Cl.
  CPC ................................... B60R 11/00 (2013.01)
(58) Field of Classification Search
  CPC ........... B60H 1/00507; B60H 1/00521; B60R 11/00; B60R 2011/0038; F16F 15/08; H02K 5/24

USPC ................................................ 296/1.03, 1.07
See application file for complete search history.

(56) References Cited

U.S. PATENT DOCUMENTS

| | | | | |
|---|---|---|---|---|
| 2013/0328337 A1* | 12/2013 | Melcher | ................. | B60R 1/076 248/560 |
| 2024/0167529 A1* | 5/2024 | Gaspar | ................... | F16F 15/08 |

FOREIGN PATENT DOCUMENTS

| | | |
|---|---|---|
| DE | 102006035583 A1 | 2/2008 |
| EP | 2060379 A1 | 5/2009 |

* cited by examiner

*Primary Examiner* — Jason S Daniels
(74) *Attorney, Agent, or Firm* — Ingrassia Fisher & Lorenz, LLP | IF&L

(57)         ABSTRACT

A mounting system for mounting a vehicle component, the mounting system comprising an inner sleeve and an outer sleeve, and a plurality of dampers interposed between the inner sleeve and the outer sleeve, the outer sleeve having at least one mounting feature for mounting the mounting system having a vehicle component attached thereto, and wherein the inner sleeve includes an anti-rotational feature for mating with an anti-rotational feature on the vehicle component.

20 Claims, 7 Drawing Sheets

MOUNTING SYSTEM FOR A VEHICLE COMPONENT

INTRODUCTION

The technical field generally relates to mounting systems for vehicle components, components thereof, and methods of assembling.

BACKGROUND

Prior mounting systems for vehicle components have limited mounting locations and orientation of the component. These mounting systems may include dampers that provide limited directional damping. The components often have limited locations for mounting features, which makes the component difficult to mount to a vehicle.

Accordingly, it is desirable to provide mounting systems including dampers that can be mounted in several locations, provide multi-directional damping, can be mounted in multiple orientations, are easier to mount, limit rotation of the component, can be used and tailored for different components. Furthermore, other desirable features and characteristics of the variations disclosed herein will become apparent from the subsequent detailed description and the appended claims, taken in conjunction with the accompanying drawings and the foregoing.

SUMMARY

A number of variations disclosed may include a product which may include a mounting system having an inner sleeve, an outer sleeve, and a plurality of spaced apart dampers between the inner sleeve and outer sleeve.

In a number of variations, at least the inner sleeve may include an engagement feature to couple with an anti-rotation feature on a first vehicle component.

In a number of variations, the mounting system may include an outer sleeve having a mounting feature for mounting to a second vehicle component.

BRIEF DESCRIPTION OF THE DRAWINGS

The variations will hereinafter be described in conjunction with the following drawing figures, wherein like numerals denote like elements, and wherein.

DETAILED DESCRIPTION

The following detailed description is merely illustrative in nature and is not intended to limit the application and uses. Furthermore, there is no intention to be bound by any expressed or implied theory presented in the preceding technical field, background, brief summary or the following detailed description.

Figure 1:
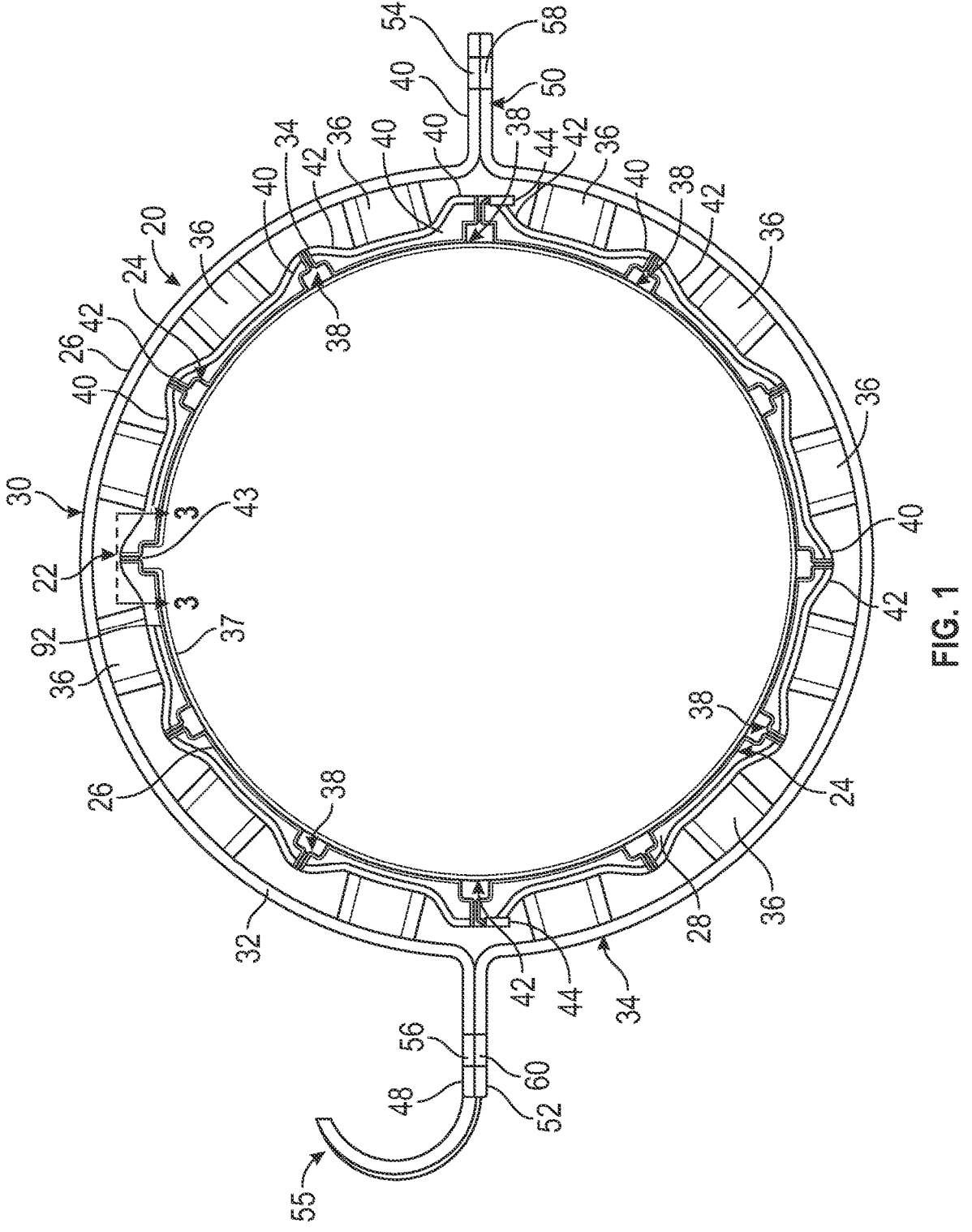
FIG. 1 is a sectional view of a mounting system connected to a vehicle component according to a number of variations.

FIG. 1 is a sectional view of a mounting system 20 connected to a vehicle component 22 according to a number of variations. The mounting system 20 may include an inner sleeve 24, which may be a single piece or may be multiple pieces connected or coupled together. In a number of variations, the inner sleeve 24 may include or may be made from a variety of materials including a polymeric material, such as but not limited to, a plastic, thermoset, or composite material. In a number of variations, the inner sleeve 24 may include or be made from a metal. In a number of variations, the inner sleeve 24 includes a first portion 26 and a second portion 28.

The mounting system 20 may also include an outer sleeve 30, which may be a single piece or may be multiple pieces connected or coupled together. In a number of variations, the outer sleeve 30 may include or may be made from a variety of materials including a polymeric material, such as but not limited to, a plastic, thermoset, or composite material. In a number of variations, the outer sleeve 30 may include or be made from a metal. In a number of variations, the outer sleeve may include a first portion 32 and a second portion 34.

A plurality of spaced apart dampers 36 may be interposed between the inner sleeve 24 and the outer sleeve 30. In a number of variations, the dampers may be a synthetic elastomer or natural elastomer such as rubber. The number of dampers 36 may vary in quantity, placement, and stiffness. The number of dampers come out of the arrangement of their placement, and the stiffness of each tamper may be tuned individually to achieve the desired mode placement and modal purity targets as desired for any vehicle component 22. In a number of variations, the vehicle component may be a compressor, motor, tank, or any number of other types of vehicle components. In a number of variations, the vehicle component 22 is a compressor for compressing a fluid, which may include a gas, liquid, or mixture thereof. In a number of variations, the compressor may be an air conditioner compressor. In a number of variations that compressor may be an air compressor.

In a number of variations, the vehicle component may have an outer surface with a portion that is cylindrical. In number of variations, the portions of the first portion 32 and the second portion 34 of the outer sleeve 30 may be cramped, riveted, or snapped together to create alignment as well as compression of the mounting system or have an interlocking feature to prevent misalignment during shipping and handling.

A pocket 38 may be defined by an inner surface 37 of the inner sleeve. In a number of variations, inner sleeve may include a first flexible finger 40 and second flexible finger 42 which form the pocket 38. An anti-rotation feature 23 may be formed on an outer surface of the vehicle component 22. In a number of variations, the anti-rotation feature 23 may be cast, stamped, machined in the outer surface of the vehicle component, or may be provided by external bracketry. In a number of variations, the anti-rotation feature 23 may be a protrusion or nub formed on the outer surface of the vehicle component 22. The anti-rotation feature 23, for example in the case of a protrusion or nub, may also be an alignment feature to correctly position the mounting system 20, particularly when the dampers 36 vary in properties.

Retention clips 62 may be used to connect the first portion 26 and the second portion 28 of the inner sleeve 24. In a number of variations, the inner sleeve 24 may be locked together or onto a vehicle component 22 with a snap in feature with sufficient force to sustain shipping and handling. In a number of variations, the inner sleeve 24 may have a clamshell configuration wherein the first portion 26 and the second portion 28 are a single, unitary, piece with a thin flexible portion extending between the first portion 26 and the second portion 28 allowing opposite ends of the inner sleeve 24 to be open up a distance sufficient to place the inner sleeve 24 over the vehicle component 22. Variations of retention clips 62 will be described hereafter.

The first portion 32 of the outer sleeve 30 may have a first flange 46 at one end and a second flange 48 at another end. In a number of variations, one or more of the flanges, for example the second flange 48, may have an extension 55 having a hook shape to facilitate easy handling by an installer or installation equipment. The second portion 34 of the outer sleeve 30 may have a first flange 50 at one end and a second flange 52 at another end. A first bolt hole 54 may be formed in the first flange 46 of the first portion 32 of the outer sleeve 30 and a second bolt hole 56 may be formed in the second flange 48 of the first portion 32 of the outer sleeve 30. A third bolt hole 58 may be formed in the first flange 50 of the second portion 34 of the outer sleeve 30 and a fourth bolt hole 60 may be formed in the second flange 52 of the second portion 34 of the outer sleeve 30. One or more of the holes 54, 56, 58, 60 may be utilized as lift assist holes for the vehicle component 22 and mounting to be hoisted as an assembly.

Figure 2:
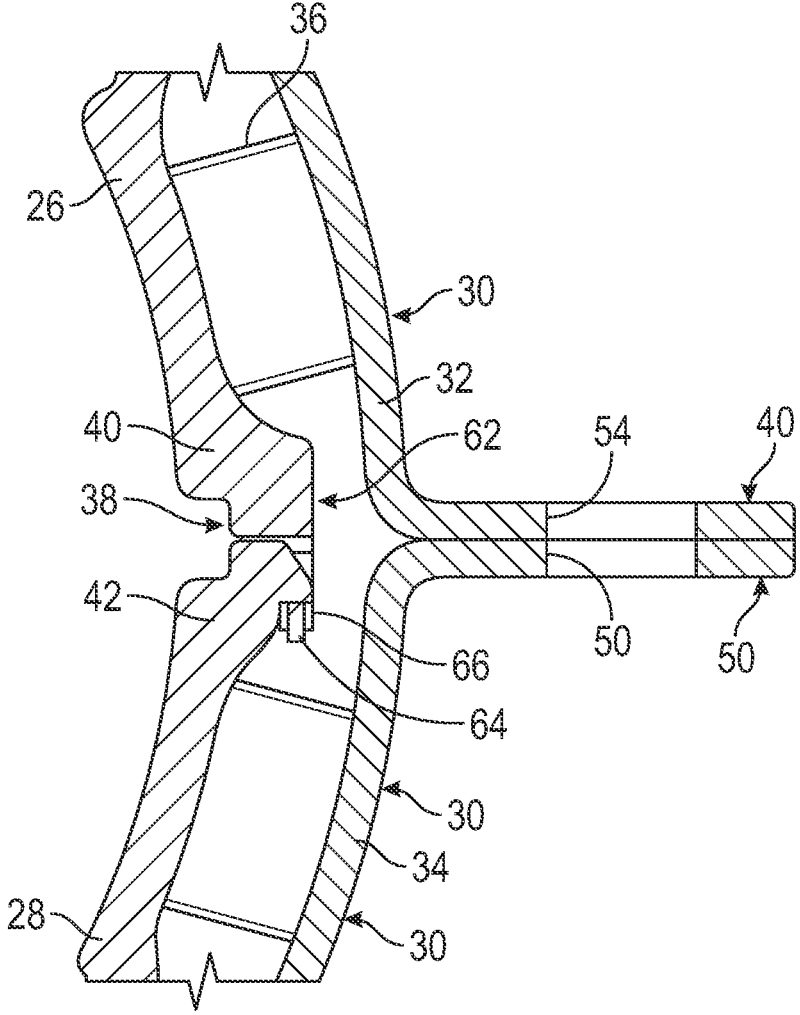
FIG. 2 is an enlarged, partial view of a mounting system shown in FIG. 1 showing a retention clip used to connect a first portion and a second portion of the mounting system together according to a number of variations.

FIG. 2 is an enlarged, partial view of a mounting system shown in FIG. 1 showing a retention clip 62 used to connect a first portion 26 and a second portion of the mounting system together according to a number of variations. A bolt 64 may extend through a first flexible finger 40 of the first portion 26 of the inner sleeve 24 and through the second flexible finger 42 of the second portion 28 of the inner sleeve 24. A nut 66 may hold the bolt in place and connect the first portion 26 and the second portion 28 of the inner sleeve 24 together.

Figure 3:
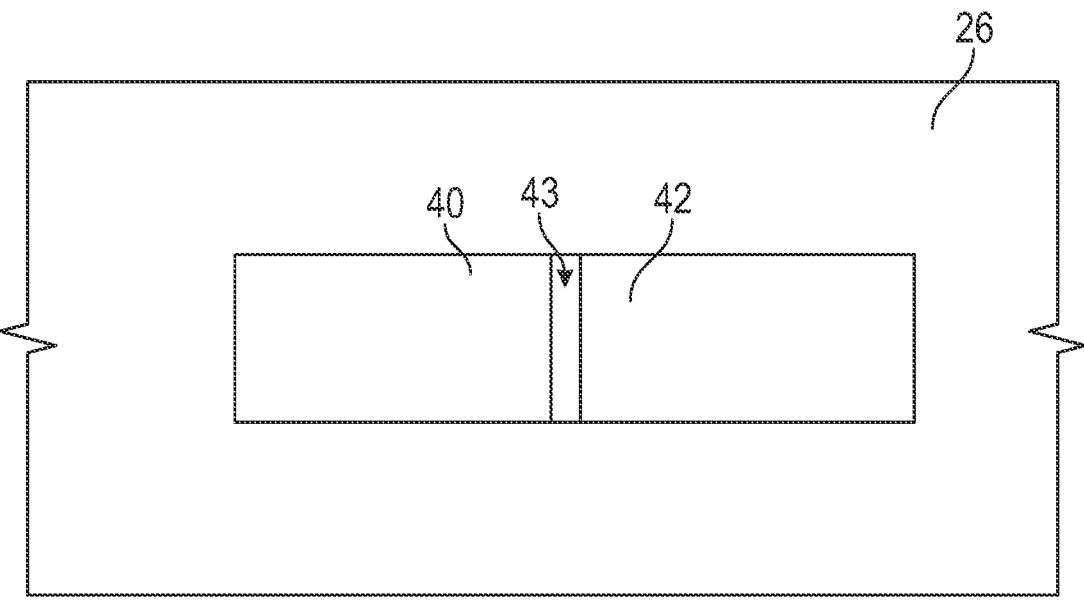
FIG. 3 is a top view, taken along line 3-3 of FIG. 2, of a portion of an inner sleeve of the mounting system according to a number of variations.

FIG. 3 is a top view taken along line 3-3 of a portion of an inner sleeve of the mounting system according to a number of variations. The first portion 26 of the inner sleeve 24 may have a first flexible finger 40 and the second flexible finger 42 with a space or gap 43 therebetween.

Figure 4:
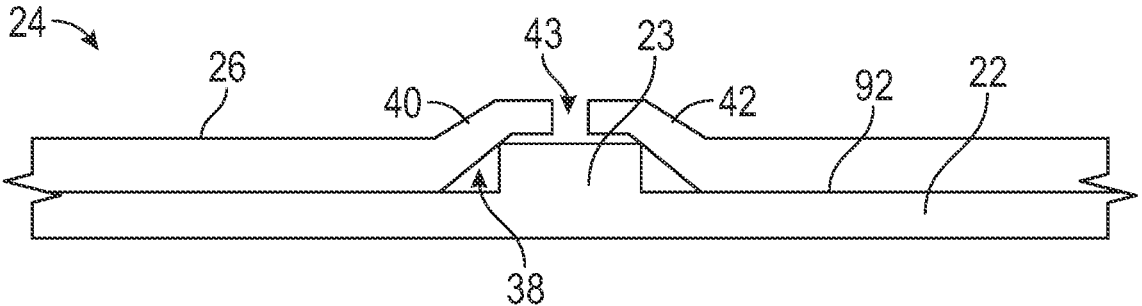
FIG. 4 is a partial, side view, with portions removed, of FIG. 1 showing an inner sleeve of the mounting system having flexible fingers locked to an anti-rotation feature of a vehicle component according to a number of variations.

FIG. 4 is a partial, side view, with portions removed, of FIG. 1 showing an inner sleeve of the mounting system having flexible fingers locked to an anti-rotation feature of a vehicle component according to a number of variations. The first portion 26 of the inner sleeve 24 may be the anti-rotation feature 23 of the vehicle component 22 so that the anti-rotation feature 23 is press fit against the first flexible finger 40 and the second flexible finger 42. The space 43 may widen as the flexible fingers 40, 42 are biased away from each other by the anti-rotation feature 23 but still provide sufficient pressure on the anti-rotation feature 23 to prevent rotation of the inner sleeve 24.

Figure 5:
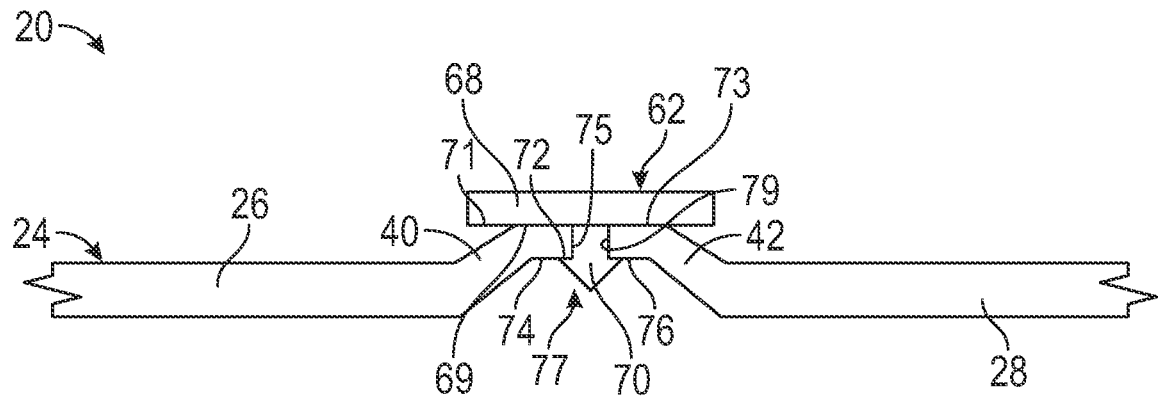
FIG. 5 is a partial, sectional view of the inner sleeve of a mounting system with a retention clip slidably received over a first end of a first portion and a first end of a second portion of the inner sleeve according to a number of variations.

FIG. 5 is a partial, sectional view of the inner sleeve 24 of a mounting system 20 with a retention clip 62 slidably received over a first end 75 of a first portion 26 of the inner sleeve 24 and a first end 79 of a second portion 28 of the inner sleeve 24 according to a number of variations. In a number of variations, the retention clip 62 may include a head 68 having a bottom face 69 engaging a top surface 71 of the first flexible finger 40 and the top surface 73 of the second flexible finger 42. A projection 70 may extend from the bottom face 69 and be slid between the first end 75 of the first flexible finger 40 and a first end 79 of the second flexible finger 42. The projection 70 may include a head portion 77 having a shoulder 72 for engaging an inner face 74 of the first flexible finger 40 and an inner face 76 of the second flexible finger 42.

Figure 6:
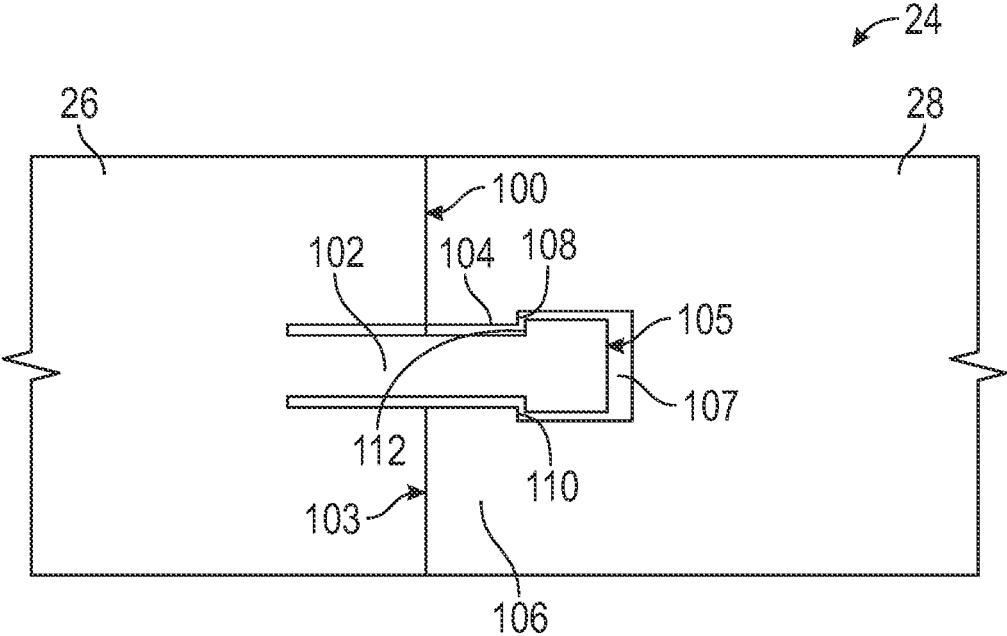
FIG. 6 is a partial, top view of a first end of a first portion of an inner sleeve coupled to a first end of a second portion of an inner sleeve using a snap fit connection.

FIG. 6 is a partial, top view of a first end 100 of a first portion 26 of an inner sleeve 24 coupled to a first end 103 of a second portion 28 of an inner sleeve 24 using a snap fit connection. In a number of variations, the first portion 26 and the second portion 28 of the inner sleeve 24 may be connected together using mating snap fit features. The first portion 26 of the inner sleeve 24 may include a first end 100 that has a flexible elongated tang 102 having a head portion 105 and a shoulder 112 for mating with a shoulder 108 of a first flexible finger 104 and a shoulder 110 of a second flexible finger 106 at a first end 103 of the second portion 28 of the inner sleeve 24. The flexible fingers 104 and 106 form a pocket 107 into which the tang 102 may be pressed into.

Figure 7:
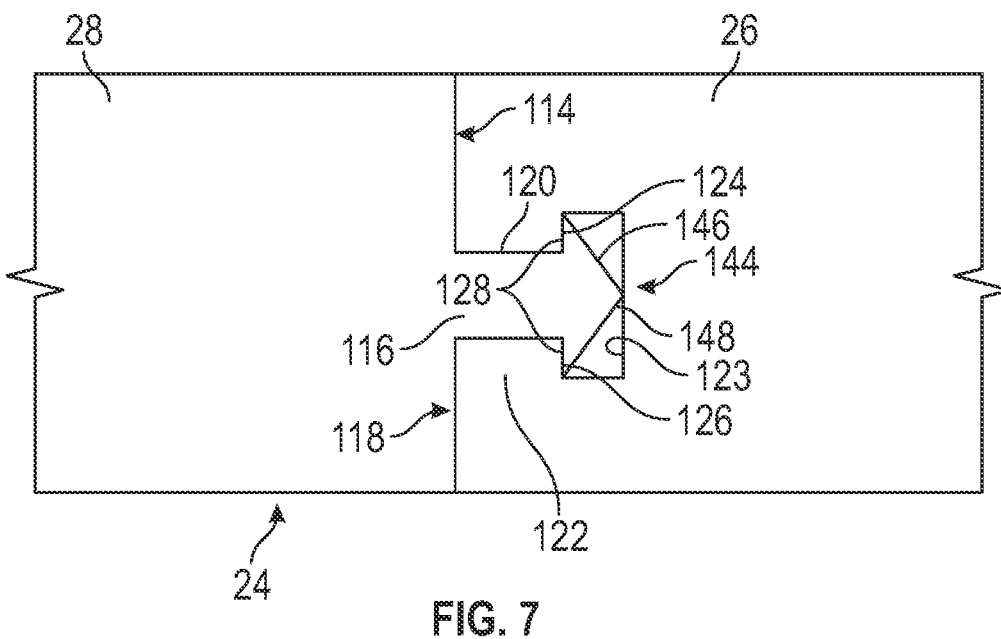
FIG. 7. is a partial, top view of a second end of a first portion of an inner sleeve coupled to a second end of a second portion of an inner sleeve using a snap fit connection.

FIG. 7. is a partial, top view of a second end 118 of a first portion 26 of an inner sleeve 24 coupled to a second end 114 of a second portion 28 of an inner sleeve 24 using a snap fit connection. In a number of variations, an alternative coupling technique may be used to couple together the first portion 26 and the second portion 28 of the inner sleeve 24. The second portion 28 of the inner sleeve 24 may have a second end 114 and a projection 116 having a head portion 144 and first surface 146 sloped with respect to a longitudinal axis of the projection 116 and a second surface 148 sloped with respect to the longitudinal axis the projection 116. The second end 118 of the first portion 26 of the inner sleeve 24 may have a pair of spaced apart flexible fingers 120, and 122 forming a pocket 123. The projection 116 may be pushed through the spaced apart flexible fingers 120 and 122 of the first portion 26 of the inner sleeve 24 so that a shoulder 128 of the head portion 144 of the projection 116 engages shoulders 124 and 126 of the first flexible finger 120 and second flexible finger 122, respectively.

Figure 8:
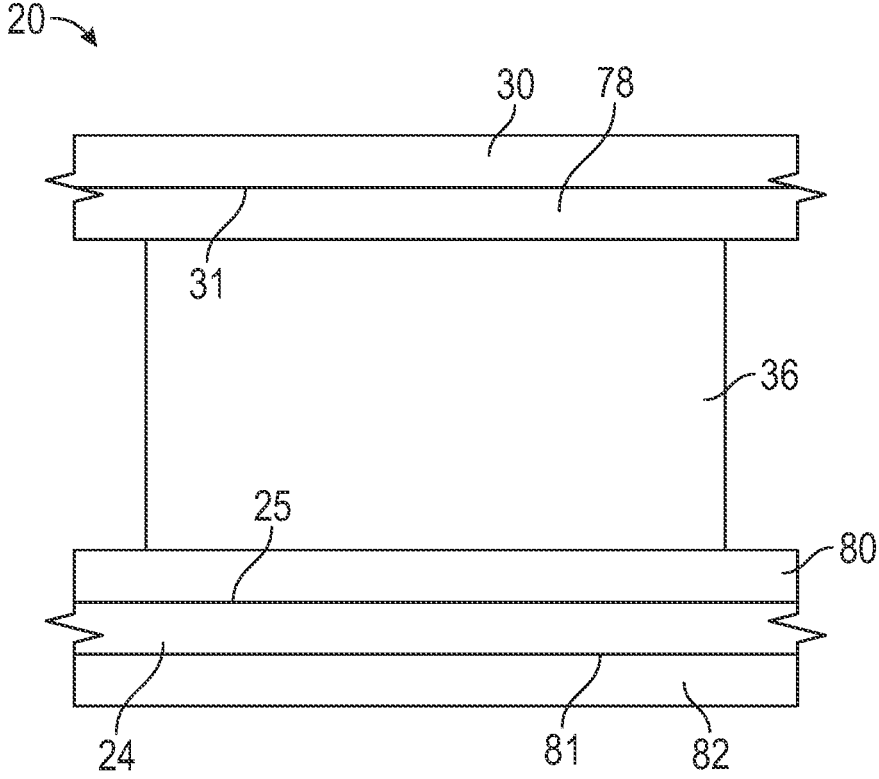
FIG. 8 is a partial, sectional view of a mounting system having an inner sleeve and an outer sleeve and a damper therebetween, and wherein an inner surface of the outer sleeve and an outer surface of the inner sleeve have an elastomeric coating or layer thereon according to a number of variations.

FIG. 8 is a partial, sectional view of a mounting system 20 having an inner sleeve 24 and an outer sleeve 30 and a damper 36 therebetween, and wherein an inner surface of the outer sleeve and an outer surface of the inner sleeve have an elastomeric coating or layer thereon according to a number of variations. In a number of variations, a first elastomeric coating or layer 78 may be provided on an inner face 31 of the outer sleeve 30. In a number of variations, a second elastomeric coating or layer 80 may be placed and an outer surface 25 of the inner sleeve 24. Elastomeric coatings or layers 78 and 80 may assist in securely attaching and elastomeric damper 36 to the inner sleeve 24, and if desired to the outer sleeve 30 because similar materials are easier to bond together than different materials. An adhesive layer may be interposed between the damper 36 and coatings or layers 78 and 80. The damper 36 may also be attached to the outer sleeve 30, or to the coating or layer 78, and the coating or layer 80, or the inner sleeve 24 by a variety of methods including ultrasonic bonding or heat welding. In a number of variations, an acoustic layer 82 may be attached, snapped over or formed on an inner surface 81 of the inner sleeve 24 to reduce airborne noise produced by the vehicle component 22.

Figure 9:
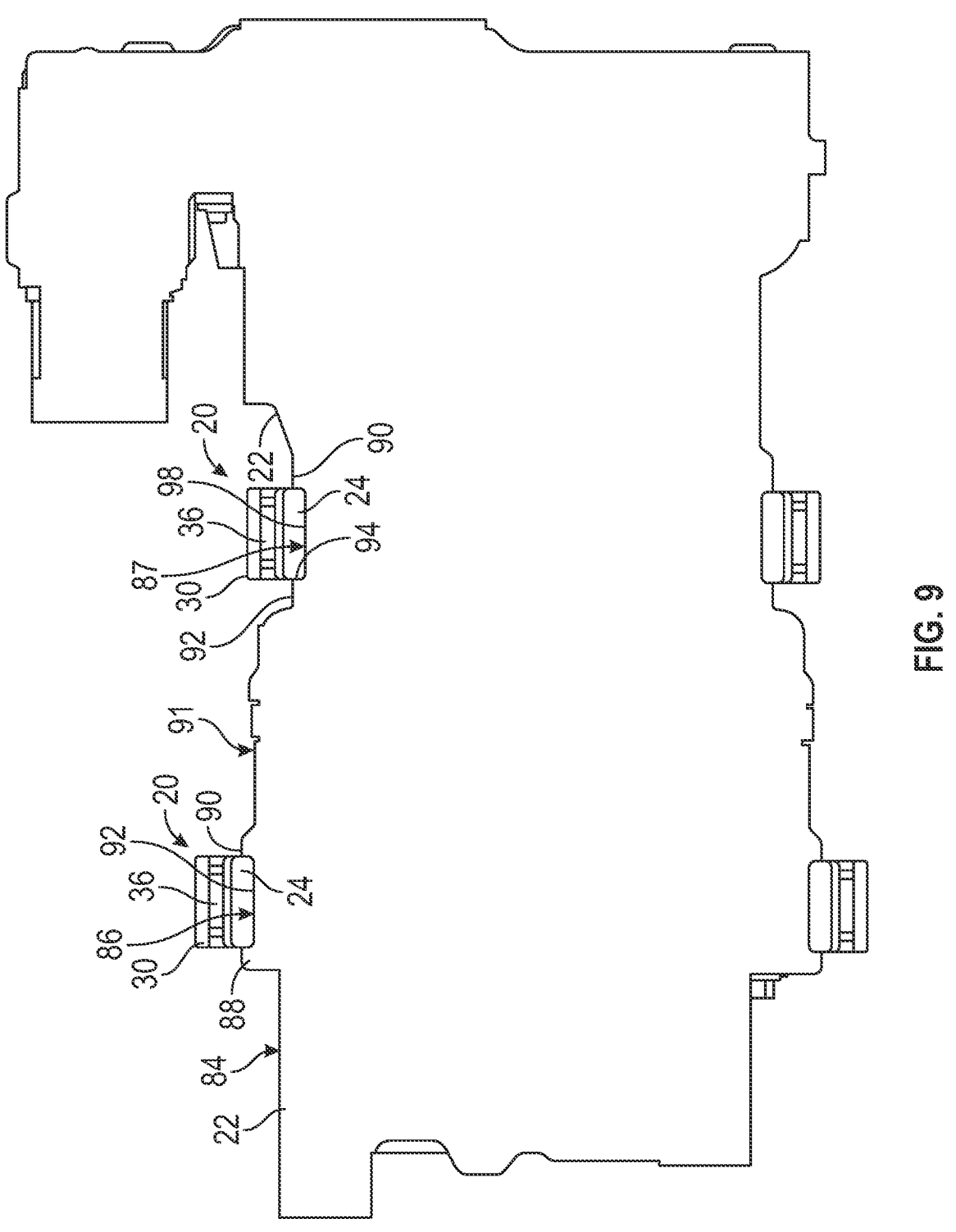
FIG. 9 is a sectional view of two mounting systems connected to a vehicle component wherein each mounting system is received in a separate channel defined in an outer surface of the vehicle component according to a number of variations.

FIG. 9 is a sectional view of two mounting systems 20 connected to a vehicle component 22 wherein each mounting system 20 is received in a separate channel 86, 87, respectively, defined in an outer surface of the vehicle component 22 or provided on an outer surface of the vehicle component 22 according to a number of variations. In a number of variations, the channels 86, 87 may be cast, stamped, or machined into the outer surface of the component or may be created by external bracketry. In a number of variations, the vehicle component 22 may have an outer surface 91 forming a channel 86. In a number of variations, the channel 86 may be formed by a first ridge 88 and a space apart second ridge 90 extending upward from a base surface 92. The mounting system 20 may be received in the channel 86. In a number of variations, the channel is formed and a portion of the vehicle component 22 that is cylindrical and the channel 86 may extend around the circumference of the portion of the vehicle component 22 that is cylindrical. In a number of variations, A plurality of spaced apart and parallel channels (or a plurality of spaced apart channels in the same imaginary plane) may be formed in the outer surface of the vehicle component 22, and wherein the mounting system 20 is received in the plurality of space apart and parallel channels. In another variation, a channel 87 may be formed in the outer surface 91 of the vehicle component 22 and may be defined by a first wall 94 extending downward from a base surface 92 and as space apart second wall 96 also extending downward from a base surface 92, wherein the first wall 94 and second wall 96 are connected by a floor 98 so that the first wall 94, floor 98 and second wall 96 form the channel 87. The mounting system 20 may be received in the channel 87 defined by the first wall 94, second wall and floor 98.

Figure 10:
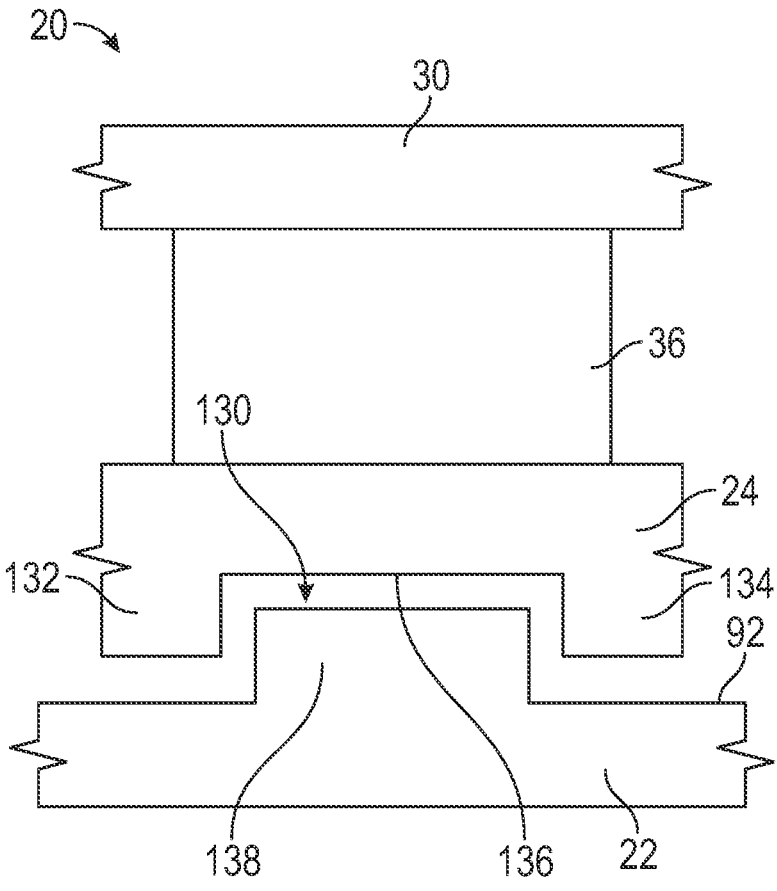
FIG. 10 is the sectional view of a mounting system having an inner sleeve defining a channel and a vehicle component having a rail received in the channel according to a number of variations.

FIG. 10 is the sectional view of a mounting system 20 having an inner sleeve 24 defining a channel 130 and a vehicle component 22 having a rail 138 received in the channel according to a number of variations. In a number of variations, a channel 130 may be formed by a first ridge 132 and a space apart second ridge 134 extending from a base surface 136 of the inner sleeve 24. A rail 138 may extend from a base surface 92 of the vehicle component 22 and may be received in the channel 130 formed in the inner sleeve 24. In a number of variations, the rail extends the entirety of the circumference of a cylindrical portion of the base surface 92 of the vehicle component 22. In a number of variations, a plurality of spaced apart and parallel rails (or a plurality of spaced apart rails in the same imaginary plane) may be formed on the base surface 92 of the vehicle component and so that the plurality of rails 138 are received in the channel 130 formed in the inner sleeve 24.

The number of variations, the mounting system 20 may be used to mount a vehicle component 22 in an electric vehicle at multiple locations and without having to have limited mounting features on the vehicle component to facilitate mounting the vehicle component close to a belt drive. In a number of variations, one or more mounting systems 20 may be positioned on the vehicle component closer to the center of gravity of the vehicle component. In a number of variations, different mounting systems may use the inner sleeve 24 and the outer sleeve 30 as described herein but designed and made for a variety of different vehicle components having different configurations, weights and modes of operation, and mounted in different locations, wherein elastomer dampers may be interposed between the inner sleeve 24 and outer sleeve 30 at different locations, with different quantities, and different stiffnesses for different vehicle components.

The following description of variants is only illustrative of components, elements, acts, product, and methods considered to be within the scope of the invention and are not in any way intended to limit such scope by what is specifically disclosed or not expressly set forth. The components, elements, acts, product, and methods as described herein may be combined and rearranged other than as expressly described herein and still are considered to be within the scope of the invention.

Variation 1 may include a product having a mounting system for mounting a vehicle component, the mounting system comprising an inner sleeve and an outer sleeve, and a plurality of dampers interposed between the inner sleeve and the outer sleeve, the outer sleeve having at least one mounting feature for mounting the mounting system having a vehicle component attach thereto.

Variation 2 may include the product as set forth in Variation 1 wherein the dampers are at least one of synthetic elastomers, natural elastomers, or compression springs.

Variation 3 may include the product as set forth in any of Variations 1-2 wherein the inner sleeve includes an anti-rotational feature for mating with an anti-rotational feature on the vehicle component.

Variation 4 may include the product as set forth in Variation 3 wherein the anti-rotational feature of the inner sleeve includes an inner surface defining a pocket for receiving the anti-rotational feature of the vehicle component that comprises a protrusion or nub.

Variation 5 may include the product as set forth in any of Variations 1-4 wherein the inner sleeve comprises a first portion and a second portion, and a retention feature for coupling the first portion and the second portion of the inner sleeve together.

Variation 6 may include the product as set forth in Variation 5 wherein the retention feature further comprises a threaded bolt extending through a first flexible finger and a second flexible finger and a nut secured to the threaded bolt.

Variation 7 may include the product as set forth in Variation 2 further comprising an elastomeric coating or layer over at least an outer surface the inner sleeve.

Variation 8 may include the product as set forth in any of Variations 1-7 wherein the plurality of dampers varies in at least one of placement or stiffness.

Variation 9 may include the product as set forth in any of Variations 1-8 wherein the inner sleeve comprises a first portion and a second portion, and wherein the plurality of dampers comprises a first damper on the first portion and a second damper on the second portion, and wherein the first damper is different than the second damper.

Variation 10 may include a method including attaching a mounting system to a vehicle component, the mounting system comprising an inner sleeve and an outer sleeve, and a plurality of dampers interposed between the inner sleeve and the outer sleeve, the outer sleeve having at least one mounting feature for mounting the mounting system having a vehicle component attach thereto.

Variation 11 may include a method as set forth in Variation 10 wherein the dampers are at least one of synthetic elastomers, natural elastomers, or compression springs.

Variation 12 may include a method as set forth in any of Variations 10-11 wherein the inner sleeve includes an anti-rotational feature for mating with an anti-rotational feature on the vehicle component.

Variation 13 may include a method as set forth in Variation 12 wherein the anti-rotational feature of the inner sleeve includes an inner surface defining a pocket for receiving the anti-rotational feature of a vehicle component, wherein the anti-rotational feature of the vehicle component comprises a protrusion or nub.

Variation 14 may include a method as set forth in any of Variations 10-13 wherein the inner sleeve comprises a first portion and a second portion, and a retention feature for coupling the first portion and the second portion of the inner sleeve together.

Variation 15 may include a method as set forth in Variation 14 wherein the retention feature comprises a first flexible finger and an opposed second flexible finger.

Variation 16 may include a method as set forth in any of Variations 10-15 further comprising an elastomeric coating or layer over at least an outer surface the inner sleeve.

Variation 17 may include a method as set forth in any of Variations 10-16 wherein the plurality of dampers varies in at least one of placement or stiffness.

Variation 18 may include a method as set forth in any of Variations 10-17 wherein an outer surface of the vehicle component defines a channel or the inner sleeve defines a channel, and wherein the inner sleeve is received in the channel defined in the outer surface of the vehicle component or the outer surface of the vehicle component includes a rail received in the channel defined in the inner sleeve.

Variation 19 may include a product including a vehicle component having at least one of 1) a first channel extending along at least a portion of a first cylindrical surface of the vehicle component and a second channel extending along at least a portion of a second cylindrical surface of the vehicle component, or 2) a first rail extending along at least a portion of a first cylindrical surface of the vehicle component and a second rail extending along at least a portion of a second cylindrical surface of the vehicle component.

Variation 20 may include a product as set forth in Variation 19 wherein in the vehicle component further comprises a first anti-rotation feature comprising a protrusion or nub each in the first channel and second anti-rotation feature comprising a protrusion or nub each in the second channel, or a third anti-rotation feature comprising a protrusion or nub each on the first rail and second anti-rotation feature comprising a protrusion or nub each on the second rail.

While at least one illustrative variation has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A product, comprising:
a mounting system for mounting a vehicle component, the mounting system comprising an inner sleeve and an outer sleeve, and a plurality of dampers interposed between the inner sleeve and the outer sleeve, the outer sleeve having at least one mounting feature for mounting the mounting system having a vehicle component attached thereto, and wherein the inner sleeve includes an anti-rotational feature for mating with an anti-rotational feature on the vehicle component.

2. The product as set forth in claim 1 wherein the plurality of dampers include at least one of synthetic elastomers, natural elastomers, or compression springs.

3. The product as set forth in claim 1 wherein the anti-rotational feature of the inner sleeve includes an inner surface defining a pocket for receiving the anti-rotational feature of a vehicle component, wherein the anti-rotational feature of the vehicle component comprises a protrusion or nub.

4. The product as set forth in claim 3 wherein the anti-rotational feature of the inner sleeve includes an inner surface defining a pocket for receiving the anti-rotational feature of the vehicle component comprising a protrusion or nub.

5. The product as set forth in claim 1 wherein the inner sleeve comprises a first portion and a second portion, and a retention feature for coupling the first portion and the second portion of the inner sleeve together.

6. The product as set forth in claim 5 wherein the retention feature further comprises a threaded bolt extending through a first flexible finger and a second flexible finger and a nut secured to the threaded bolt.

7. The product as set forth in claim 2 further comprising an elastomeric coating or layer over at least an outer surface the inner sleeve.

8. The product as set forth in claim 1 wherein the plurality of dampers varies in at least one of placement or stiffness.

9. The product as set forth in claim 8 wherein the inner sleeve comprises a first portion and a second portion, and wherein the plurality of dampers comprises a first damper on the first portion and a second damper on the second portion, and wherein the first damper is different than the second damper.

10. A method comprising:
attaching a mounting system to a vehicle component, the mounting system comprising an inner sleeve and an outer sleeve and a plurality of dampers interposed between the inner sleeve and the outer sleeve, the outer sleeve having at least one mounting feature for mounting the mounting system having a vehicle component attach thereto, and wherein the inner sleeve includes an anti-rotational feature for mating with an anti-rotational feature on the vehicle component.

11. The method as set forth in claim 10 wherein the plurality of dampers include at least one of synthetic elastomers, natural elastomers, or compression springs.

12. The method as set forth in claim 10 wherein the inner sleeve comprises a first portion and a second portion, and wherein the plurality of dampers comprises a first damper on the first portion and a second damper on the second portion, and wherein the first damper is different than the second damper.

13. The method as set forth in claim 12 wherein the anti-rotational feature of the inner sleeve includes an inner surface defining a pocket for receiving the anti-rotational feature of a vehicle component, wherein the anti-rotational feature of the vehicle component comprises a protrusion or nub.

14. The method as set forth in claim 11 wherein the inner sleeve comprises a first portion and a second portion, and a retention feature for coupling the first portion and the second portion of the inner sleeve together.

15. The method as set forth in claim 14 wherein the retention feature comprises a first flexible finger and an opposed second flexible finger.

16. The method as set forth in claim 11 further comprising an elastomeric coating or layer over at least an outer surface the inner sleeve.

17. The method as set forth in claim 11 wherein the plurality of dampers varies in at least one of placement or stiffness.

18. The method as set forth in claim 11 wherein an outer surface of the vehicle component defines a channel or the inner sleeve defines a channel, and wherein the inner sleeve is received in the channel defined in the outer surface of the vehicle component or the outer surface of the vehicle component includes a rail received in the channel defined in the inner sleeve.

19. A product comprising:
a vehicle component having at least one of 1) a first channel extending along at least a portion of a first cylindrical surface of the vehicle component and a second channel extending along at least a portion of a second cylindrical surface of the vehicle component, or 2) a first rail extending along at least a portion of a first cylindrical surface of the vehicle component and a second rail extending along at least a portion of a second cylindrical surface of the vehicle component; and
a mounting system for mounting a vehicle component, the mounting system comprising an inner sleeve and an outer sleeve, and a plurality of dampers interposed between the inner sleeve and the outer sleeve, the outer sleeve having at least one mounting feature for mounting the mounting system having a vehicle component attach thereto, and wherein the inner sleeve comprises a first portion and a second portion, and a retention feature for coupling the first portion and the second portion of the inner sleeve together.

20. A product as set forth in claim 19 wherein in the vehicle component further comprises a first anti-rotation feature comprising a protrusion or nub each in the first channel and second anti-rotation feature comprising a protrusion or nub each in the first channel, or a third anti-rotation feature comprising a protrusion or nub each on the first rail and second anti-rotation feature comprising a protrusion or nub each on the second rail.

* * * * *